Patented Jan. 28, 1947

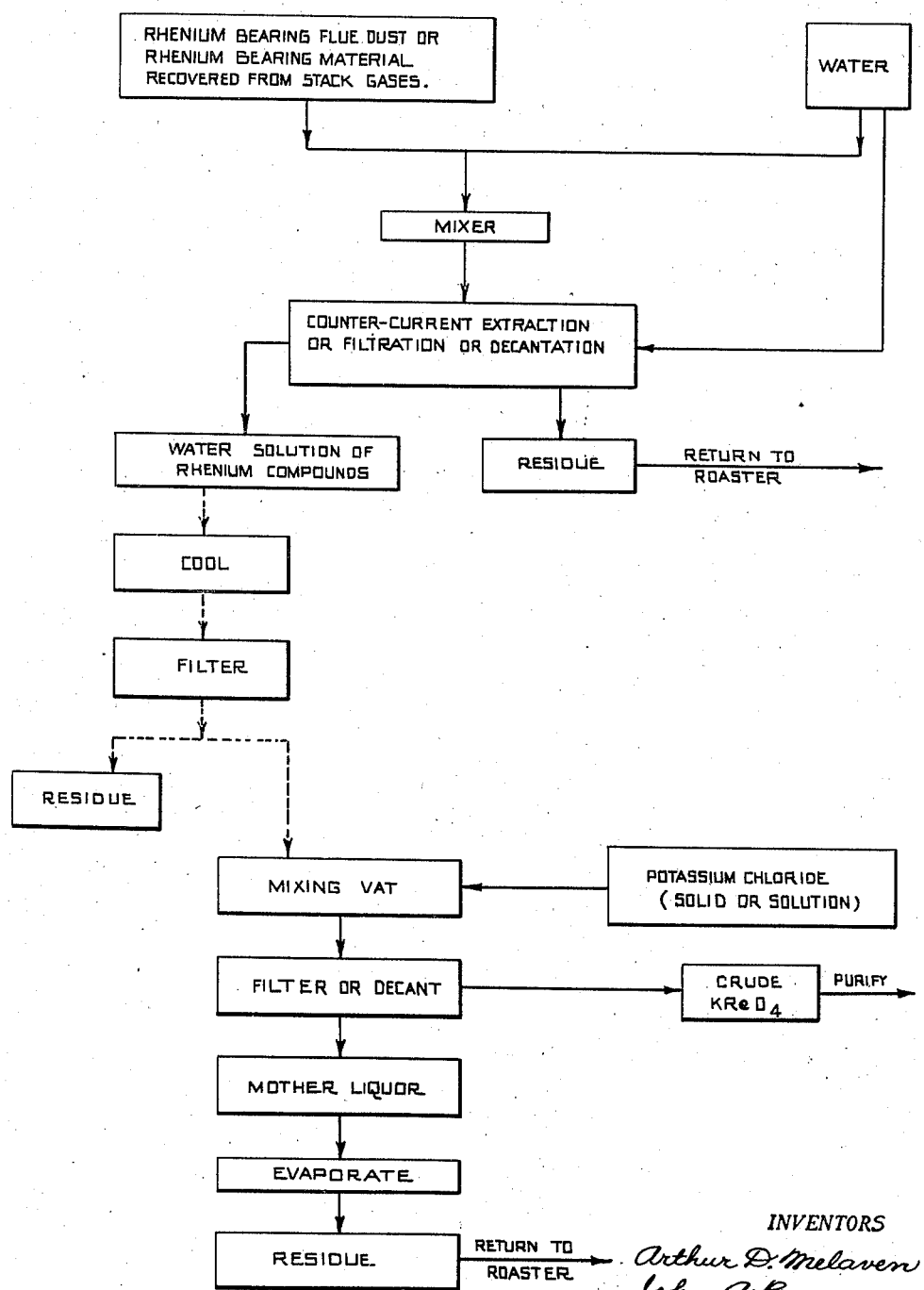

2,414,965

UNITED STATES PATENT OFFICE 2,414,965

PROCESS FOR RECOVERING RHENIUM

Arthur D. Melaven and John A. Bacon, Knoxville, Tenn., assignors to The University of Tennessee Research Corporation, Knoxville, Tenn., a corporation of Tennessee Application August 23, 1943, Serial No. 499,718

5 Claims. (Cl. 23—22)

This invention relates to the art of metallurgy and more particularly to the art of recovering metals from ores, ore concentrates or from raw materials containing metals. More particularly this invention relates to the recovery of the rare metal rhenium from ores, crude concentrates or raw materials which may contain the metal.

One of the objects of the present invention is to provide a method of concentrating and separating rhenium and/or one or more of its compounds from its ores and from by-products resulting from the treatment of rhenium bearing ores.

Another object of the invention is to provide a commercial process for the recovery of rhenium and rhenium compounds from products resulting from the roasting of rhenium bearing ores and minerals.

Other objects and advantages will be disclosed in the process hereinafter described.

Rhenium has never been found in naturally occurring products (ores and minerals) in concentrations higher than a fraction of 1 percent. As far as is known, certain sulfide ores contain rhenium in the greatest quantities. During the roasting process to which these sulfide ores and minerals are frequently put the rhenium is converted in a large degree, in the presence of oxidants such as air or oxygen and the acidic substances formed during the roasting, to rhenium heptoxide, $Re_2O_7$, various hydrated forms of rhenium heptoxide and other soluble compounds of rhenium. These compounds are volatile and pass off from the roaster along with other substances and a good portion of such rhenium will be found concentrated in the flue dusts or stack gases. Some of the rhenium may fail to be collected in such flue deposits but may be caught from the flue gases by passing the latter through suitable filtering devices, precipitators, absorption or scrubbing towers or other equipment.

The processes heretofore employed and described for the recovery of rhenium involve more or less elaborate treatments whereas we have devised a particularly efficacious and simple method whereby rhenium may be recovered from products resulting from the treatment of rhenium bearing ores. Our process, described below, is indicated schematically in the accompanying flow sheet drawing.

Rhenium heptoxide, $Re_2O_7$, and its hydrated forms are readily soluble in water and if the rhenium bearing flue dusts and stack gases, or rhenium bearing compounds recovered from the stack gases, are treated with water as in countercurrent, filtration or decantation procedures the solution obtained will contain the rhenium as soluble perrhenate. After filtering or otherwise separating the rhenium bearing solution from insoluble material the rhenium is then precipitated as potassium perrhenate by the addition to the solution of excess potassium ion (K+). Potassium chloride, KCl, is preferred as a source of potassium ion since it is commercially cheap and available and may be added to the rhenium bearing solution in the solid form with stirring or it may be added after first dissolving in water. Since the potassium ion is the precipitant other compounds of potassium such as sulfate, nitrate, carbonate, bicarbonate, hydroxide, oxide, etc., may be used in the same way. The solution may be chilled during the precipitation process to reduce the solubility of the potassium perrhenate. After precipitation is complete the crude potassium perrhenate may be separated from the mother liquor by any suitable means, such as filtering or decantation.

Prior to the addition of the potassium compound in a mixing vat the water solution of rhenium compounds may, if desired, be reduced in volume to concentrate the soluble rhenium compounds and/or treated by cooling and filtering, as indicated in dotted lines on the drawing, to remove certain objectionable materials such as ferrous sulphate, $FeSO_4$, that might give rise to undue contamination of the precipitated potassium perrhenate.

The crude potassium perrhenate may be purified by subjecting it to various physical or chemical treatments or combination of treatments such as washing, solution, precipitation, filtration, dialysis or other appropriate and known means.

One preferred embodiment of the process is shown and described on the accompanying flow sheet drawing but it is to be understood that the inventive idea is not limited thereto but is susceptible of various embodiments within the limits of the appended claims.

What is claimed is:

1. A process for separating rhenium compounds from flue dust obtained from roasting ores and the like containing the same without preliminary or added oxidation comprising the steps of forming a water solution of the flue dust, treating the solution to remove impurities, precipitating the rhenium from the solution as potassium perrhenate by the addition of a potassium compound, and purifying the precipitate.

2. A process for separating rhenium compounds from flue dust obtained from roasting ores and the like containing the same without preliminary or added oxidation comprising the steps of forming a water solution of the flue dust, filtering the solution to remove insoluble impurities and precipitating the rhenium from the solution as potassium perrhenate by the addition of a potassium compound.

3. A process for separating rhenium from flue dust obtained from roasting ores and the like containing the same without preliminary or added oxidation comprising feeding the flue dust countercurrent to a flow of water to form a water solution of the rhenium compound, cooling and filtering the solution to remove insoluble impurities, precipitating the rhenium from the solution as potassium perrhenate by the addition of a potassium compound, and purifying the precipitate.

4. A process for recovering rhenium compounds from flue dust obtained from roasting ores and the like containing the same without preliminary or added oxidation comprising the steps of feeding the flue dust in a direction countercurrent to a flow of water to form a water solution thereof, concentrating, cooling and filtering the solution to remove insoluble impurities, precipitating the rhenium from the solution as potassium perrhenate by the addition of a source of potassium ion, and filtering and purifying the precipitate.

5. A process for treating molybdenite roaster flue dust containing rhenium without preliminary or added oxidation comprising dissolving the flue dust in water, filtering and treating the solution to remove impurities therefrom, precipitating the rhenium from the solution as potassium perrhenate by the addition of potassium chloride to the solution while chilling the same, and purifying the potassium perrhenate.

ARTHUR D. MELAVEN.
JOHN A. BACON.